United States Patent [19]
Kijima et al.

[11] Patent Number: 5,093,039
[45] Date of Patent: Mar. 3, 1992

[54] HIGHLY PURE SINTERED CARBIDE WITH HIGH ELECTRIC CONDUCTIVITY AND PROCESS OF PRODUCING THE SAME

[75] Inventors: Kazunori Kijima, 131, Fukakusa Goudou Shukusha, Nishidate-cho Kanyuuchi,, Fukakusa, Fushimi-Ku Kyoto-shi, Kyoto; Eiki Arai, Narashino; Youichi Miyazawa, Narashino; Mikio Konishi, Narashino; Ken Kato, Funabashi, all of Japan

[73] Assignees: Kazunori Kijima, Kyoto; Sumitomo Cement Co., Ltd., Tokyo, both of Japan

[21] Appl. No.: 432,389

[22] Filed: Nov. 6, 1989

[30] Foreign Application Priority Data

Jan. 30, 1989 [JP] Japan ................ 1-20573
Jan. 30, 1989 [JP] Japan ................ 1-20574

[51] Int. Cl.$^5$ .................. H01B 1/06; C04B 35/56
[52] U.S. Cl. ........................ 252/516; 252/502; 501/88; 501/90; 423/345; 423/346; 419/48; 419/56; 419/57; 419/14
[58] Field of Search ............ 252/516, 502; 501/88, 501/90; 423/345, 346; 264/65; 419/14, 17, 56, 57, 48

[56] References Cited

U.S. PATENT DOCUMENTS

| | | | |
|---|---|---|---|
| 4,133,689 | 1/1979 | Stroke | 501/88 |
| 4,295,890 | 10/1981 | Stroke | 501/91 |
| 4,370,421 | 1/1983 | Matsushita et al. | 501/88 |
| 4,517,305 | 5/1985 | Suzuki et al. | 501/91 |
| 4,753,903 | 6/1988 | Saito | 252/516 |
| 4,762,810 | 8/1988 | Endo et al. | 501/88 |

OTHER PUBLICATIONS

John S. Nadeau, "Very High Pressure Hot Pressing of Silicon Carbide", American Ceramic Society Bulletin, Current Ceramic Research Issue, 2/73, vol. 52, pp. 170-174.

Chinone et al, "SiC Formation by CVD", New Ceramics, issue No. 10, 1989.

Takeda et al, "The Effects of Sintering Aids on Thermal Conductivity and Electrical Resistivity of Sintered SiC", Gyoukyo, vol. 95 [9], p. 30, 1987.

Primary Examiner—Josephine Barr
Attorney, Agent, or Firm—Oblon, Spivak, McClelland, Maier & Neustadt

[57] ABSTRACT

Disclosed is an electrically conductive sintered silicon carbide body having an electric resistivity of not higher than 1 Ω·cm, which is produced by
(a) mixing
(1) a first silicon carbide powder having a mean grain size of from 0.1 to 10 μm with
(2) a second silicon carbide powder having a mean grain size of not greater than 0.1 μm prepared by
(2-1) introducing a starting gas composed of a silane compound of silicon halide and a hydrocarbon into a plasma of a non-oxidative atmosphere, and
(2-2) conducting gas phase reaction between the silane compound or silicon halide and the hydrocarbon while controlling the pressure of the reaction system within the range of from less than 1 atom to 0.1 torr, and
(3) optionally, a carbon powder which is required for reducing oxides contained in both the first and second silicon carbide powders,
(b) optionally reducing the oxides with the carbon, and
(c) heating the resulting mixture for sintering. Also, processes of producing the same are disclosed.

11 Claims, 1 Drawing Sheet

HIGHLY PURE SINTERED CARBIDE WITH HIGH ELECTRIC CONDUCTIVITY AND PROCESS OF PRODUCING THE SAME

BACKGROUND OF THE INVENTION

The present invention relates to sintered bodies made of silicon carbide (hereafter, "sintered silicon carbide bodies") which can be used suitably not only as various structural engineering materials but also as electric materials, functional materials, etc. The present invention also relates to a process of producing such sintered bodies.

Sintered silicon carbide bodies are chemically stable both at room temperature and at high temperatures and have excellent mechanical strength at high temperatures and therefore they are expected to be useful as a construction material for producing various parts such as those for gas turbines, engines, heat exchangers, nozzles of burners, etc. These sintered silicon carbide bodies are also considered to be promising as a material for precision mold members such as optical disc, aspherical lens and the like since they have good properties such as surface smoothness, high thermal conductivity, wear resistance, and the like. In addition, sintered bodies made of highly pure silicon carbide, which are excellent in thermal resistance and chemical resistance, have been increasingly used for the production of boats and processing tubes according to the recent trend in the semiconductor industry in which higher temperatures are used for heat treatment.

Since silicon carbide is a substance which is of highly covalent bonding in nature and thus difficult to sinter, it is necessary to add to silicon carbide powder one or more elements selected from boron, carbon, aluminum, beryllium or their compounds as a sintering aid in an amount of several percents by weight in order to densify it so as to have a high density. Therefore, the sintered silicon carbide bodies obtained generally have electric resistivity which fluctuates greatly depending on the kind and amount of the sintering aid used. For example, it has been reported that sintered silicon carbide bodies which contain boron and carbon have an electric resistivity on the order of from $10^4$ to $10^5$ $\Omega\cdot$cm and those which contain aluminum compounds have an electric resistivity on the order of from 10 to $10^2$ $\Omega\cdot$cm. Both of them have relatively high electric resistivity.

To be in detail on the properties of such silicon carbides, it is noted that there are many polytypes in the crystals of thereof, which are roughly grouped into α-type and β-type ones. Each of them exhibits semiconductivity. The semiconductivity of silicon carbide crystals can be of n-type or p-type depending on the kind and amount of impurities contained therein. There have been many reports on the electric resistivity of the silicon carbide crystals. For example, Busch described that α-type silicon carbide crystal has an electric resistivity of from $10^{-4}$ to $10^{-2}$ $\Omega\cdot$cm at room temperature (cf. Silicon Carbide 1968, ed.by H. K. Henisch and R. Roy, Pergamon Press, New York (1969)). On the other hand, Nelson reported that β-type one has an electric resistivity of from $10^{-2}$ to $10^3$ $\Omega\cdot$cm at room temperature (cf. Silicon Carbide 1968. ed.by H. K. Henisch adn R. Roy, Pergamon Press, New York (1969)).

Generally, there is observed a tendency that the electric resistivity of single crystal decreases according as the concentration of impurities such as boron, nitrogen and the like contained therein increases. This is believed to be ascribable to the fact that the impurities act as carriers. Therefore, although it is true there is a possibility that single crystal silicon carbide synthesized under certain conditions may have an electric resistivity of not higher than 1 $\Omega\cdot$cm, it is difficult to produce large single crystals of silicon carbide by mean of the conventional technology. Even in the case of producing small single crystals, there is a problem that the cost for their production is high.

In view of these technical or economical problems, it is considered at present most advantageous or effective to produce sintered bodies, which are aggregates of single crystals. However, this approach causes a new problem that since there are grain boundaries in the sintered bodies and presence of impurities, if any, therein results in increase in the electric resistivity. That is, since silicon carbide is rather difficult to sinter, it is necessary to use a sintering aid in order to obtain high density sintered bodies as described above. In this case, however, the sintering aid remains in the grain boundaries as an impurity or forms solid solution in the grains of silicon carbide. The sintering aid which remains in the grain boundaries behaves as an impurity, and there is a high possibility that the electric resistivity of the grain boundaries becomes higher than that of the respective single crystals.

Various developments have heretofore been made in order to obtain electrically conductive sintered silicon carbide bodies, and those methods which impart the sintered silicon carbide bodies with conductivity are roughly classified into the following groups.

(a) A method in which at least one electrically conductive substance is added to silicon carbide, and the electrically conductive substance is continuously brought in contact with the silicon carbide in the sintered bodies;

(b) A method in which at least one electrically conductive substance or compound is added to silicon carbide so that the electrically conductive substances or compounds can be reacted with each other, or the silicon carbide can be reacted with the electrically conductive substance or compound, thus forming electrically conductive compound or complex phase in the grain boundaries of silicon carbide;

(c) A method in which electrically conductive fibers are added to silicon carbide; and the like.

Among the compounds to be added, examples of the compounds used in the method (a) include TiC, ZrC, $MoB_2$, $ZrB_2$, $MoSi_2$, $TaSi_2$, $ZrSi_2$, TiN and ZrN as disclosed in Japanese Patent Application (Kokai) No. Sho 58-209084. Examples of the compounds used in the method (b) include from 0.5 to 30% by weight of $Al_2O_3$ and $TiO_2$ as described in Japanese Patent Application (Kokai) No. Sho 57-22173. Addition of from 0.5 to 30% by volume of at least one substance selected from the group consisting of carbides, nitrides, borides and oxides of elements belonging to the group IVa, Va and VIa of the periodic table, compounds of these and $Al_4C_3$ is disclosed in Japanese Patent Application (Kokai) No. Sho 57-196770. Also, addition of from 1 to 10% by weight of at least one substance selected from aluminum and aluminum compounds, from 1 to 15% by weight of compounds of rare earth elements, and 8% by weight or less of a silicon compound is described in Japanese Patent Application (Kokai) No. Sho 60-195057. As for the method (c), there can be cited, for example, use of electrically conductive fibers composed of TiC or ZrB2 as disclosed in Japanese Patent Application (Kokai) NO.Sho 61-36162.

However, the methods for the production of the above-described electrically conductive sintered silicon carbide bodies involve the following problems.

That is, what is common among the methods (a), (b) and (c) above is the addition of at least one of electrically conductive substance or compound which is different in kind from silicon carbide, and therefore it is difficult to uniformly disperse such substance in the sintered bodies. Furthermore, there arises serious problem that when the substance is added, one or more of various characteristics such as high hardness, high corrosion resistance, high mechanical strength at high temperatures, high thermal conductivity, excellent surface smoothness, etc., which silicon carbide has inherently, will be deteriorated. It is impossible with the methods to obtain electrically conductive sintered silicon carbide bodies which satisfy the characteristic of the above-described sintered silicon carbide bodies and still have low electric resistivity.

SUMMARY OF THE INVENTION

In view of the above-described state of the art, the present invention has been completed and has for its object to obtain a sintered silicon carbide body with high density which has a high purity and less lattice defects without adding a sintering aid and thus without introducing impurities into the grain boundaries, and thus provide an electrically conductive sintered silicon carbide body having a low electric resistivity of not higher than 1 $\Omega$·cm or even not higher than 0.1 $\Omega$·cm without deteriorating the characteristics inherent thereto.

In order to attain the above-described object, intensive research has been made. As the result, it has now been found that an electrically conductive sintered silicon carbide body with a low electric resistivity as low as not higher than 1 $\Omega$·cm can be obtained without deteriorating various characteristics which silicon carbide has inherently such as high hardness, high corrosion resistance, high mechanical strength, excellent surface smoothness, and the like by mixing a first silicon carbide powder having a mean grain size of from 0.1 to 10 $\mu$m with a second silicon carbide powder having a mean grain size of not greater than 0.1 $\mu$m prepared by introducing a starting gas composed of a silane compound or silicon halide and a hydrocarbon into a plasma of a non-oxidative atmosphere, and conducting gas phase reaction while controlling the pressure of the reaction system within the range of from less than 1 atom to 0.1 torr, and then heating the resulting mixture for sintering.

It has also been found that an electrically conductive sintered silicon carbide body with a low electric resistivity as low as not higher than 0.1 $\Omega$·cm which permits electron discharge machining can be obtained without deteriorating various characteristics which silicon carbide has inherently such as high hardness, high corrosion resistance, high mechanical strength, excellent surface smoothness, and the like by mixing a first silicon carbide powder having a mean grain size of from 0.1 to 10 $\mu$m with a second silicon carbide powder having a means grain size of not greater than 0.1 $\mu$m prepared by introducing a starting gas composed of a silane compound or silicon halide and a hydrocarbon into a plasma of a non-oxidative atmosphere and conducting gas phase reaction while controlling the pressure of the reaction system within the range of from less than 1 atm to 0.1 torr, and a carbon which is required for reducing oxides such as silicon dioxide contained in the two silicon carbide powders, and then heating the resulting mixture for sintering after reducing oxides in the initial stage of the sintering.

The present invention is based on the above-described discoveries.

BRIEF DESCRIPTION OF THE ATTACHED DRAWINGS

Single figure is a graph representing the relationship between the amount of free carbon and electric resistivity of the sintered silicon carbide body of the present invention;

DETAILED DESCRIPTION OF THE INVENTION

Figure 1:
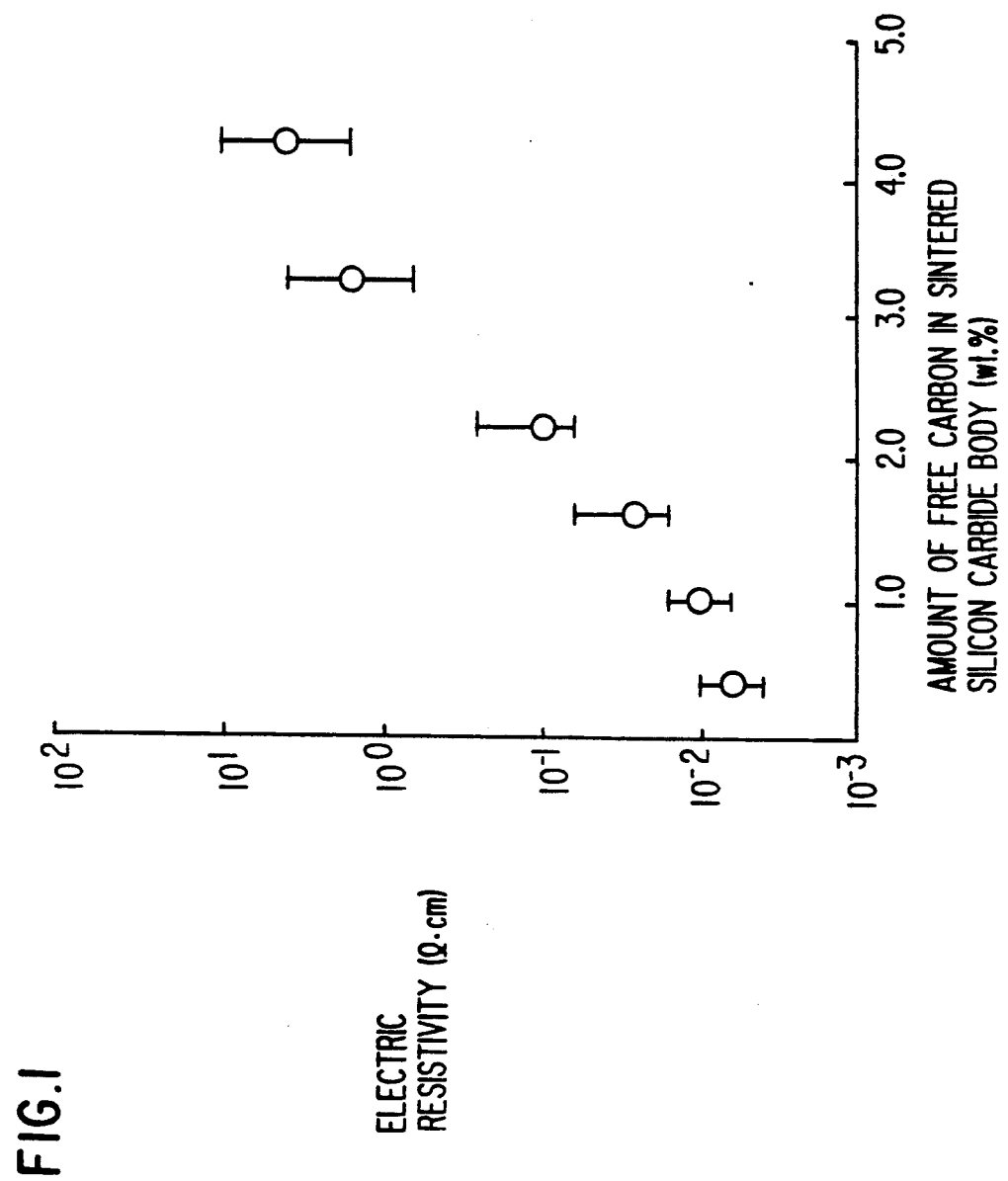

The present invention will be explained in detail referring to the process for the production of the sintered silicon carbide body.

Firstly, the first silicon carbide powder having a mean grain size of from 0.1 to 10 $\mu$m and the second silicon carbide powder having a mean grain size of not greater than 0.1 $\mu$m are provided. As for the first silicon carbide powder, there may be used those usually employed. For example, silicon carbide powders prepared by the following processes can be used.

(A) A process in which graphite and silicon are reacted at a temperature of not lower than 1,150° C.;

(B) A process in which graphite and silicon dioxide are reacted at a temperature of not lower than 1,475° C.; and (C) A process in which silica sand, coke, sawdust and salt are reacted in an electric furnace at a temperature of from 2,200° to 2,500° C.

The crystal phase of the silicon carbide thus prepared may be of any type such as amorphous, $\alpha$-type or $\beta$-type or mixture of these types. The mean grain size of the sintered silicon carbide powder is in the range of from 0.1 to 10 $\mu$m, and preferably from 0.1 to 1 $\mu$m. This is because the surface energy is lower with larger mean grain size and driving force for sintering reduces to make it difficult to obtain high density sintered bodies.

As for the second silicon carbide powder, there can be used those prepared by plasma CVD methods, more particularly, those prepared by introducing a starting gas composed of a silane compound or a silicon halide and a hydrocarbon into a plasma of non-oxidative atmosphere and conducting gas phase reaction while controlling the pressure of the reaction system within the range of from lower than 1 atm to 0.1 torr. For example, when a starting gas composed of silicon tetrachloride and ethylene is introduced in argon plasma excited with high frequency wave to perform synthesis, ultrafine amorphous powder having a mean grain size on the order of from 0.01 to 0.03 $\mu$m and a low aspect ratio can be obtained. On the other hand, when similar synthesis procedures are repeated using a starting gas composed of monosilane and ethylene, ultrafine $\beta$-type silicon carbide powder having a mean grain size on the order of from 0.005 to 0.03 $\mu$m and a low aspect ratio can be obtained. Depending on the synthesis conditions, mixed crystal phase powder composed of $\alpha$-type and $\beta$-type can be obtained. The thus-prepared ultrafine powders are excellent in sinterability so that they can give rise to high density sintered bodies by simply mixing them with the first silicon carbide powder described above without adding sintering aids.

Next, the first and second silicon carbide powders are mixed with each other to form a mixture. Upon mixing, it is preferred to blend the second silicon carbide powder in an amount of from 0.5 to 50% by weight. This is because when the amount of the second silicon carbide powder is below 0.5% by weight, the effect of mixing the second silicon carbide powder is insufficient, and on the other hand when it is above 50% by weight, the cost for the production increases since the second silicon carbide powder is prepared by costly plasma CvD method, which increases price of the product, and the effect of increasing the sintered density nearly reaches a plateau. In order to obtain sintered bodies having a density as high as 3,00 g/cm$^3$, it is preferred to mix the ultrafine powder, i.e., the second silicon carbide powder in an amount of not less than 3% by weight.

Thereafter, the above-described mixture is heated for sintering to obtain a sintered silicon carbide body having a high electric conductivity. The temperature for heating is preferably from 1,800° to 2,400° C. As for the sintering method, there can be used conventional sintering methods such as pressureless sintering, sintering under pressurized atmosphere, hot press sintering, hot isostatic pressure sintering (HIP) and the like. In order to obtain sintered silicon carbide bodies having higher density and thermal conductivity, it is preferred to use pressurized sintering methods such as hot pressing and the like. It is particularly preferred to conduct sintering in a sintering atmosphere of vacuum, inert gas or reducing gas.

The sintered silicon carbide bodies obtained according to the present invention has a uniform, fine structure of a grain size as small as from 2 to 3 μm and therefore they show excellent electron discharge machinability not attainable by the conventional methods. For example, upon wire-type electron discharge machining or ram-type electron discharge machining, the maximum surface roughness (Rmax) of the finished discharged surface is not higher than 1 μm, thus giving rise to a good finished surface. This enables free spherical finishing or three-dimensional finishing, with the result that it is possible to obtain sintered products having any desired complex shapes with high accuracy.

In addition, the sintered silicon carbide bodies of the present invention have corrosion resistance superior to the conventional ones and exhibit a three point flexural strength at room temperature of 65 kg/mm$^2$ and that at a high temperature (1,500° C.) of 80 kg/mm$^2$ and a Vickers hardness of not lower than 2,500. Therefore, the sintered silicon carbide bodies of the present invention fully satisfy various characteristics such as high hardness, high mechanical strength, high corrosion resistance, and excellent surface smoothness so that they are promising in various fields of application.

Generally, silicon carbide powder tends to be oxidized on its surface to form oxides such as silicon dioxide and the like during its synthesis or storage and thus there arises problems that its sinterability is deteriorated and that its electric resistivity increases.

In order to attain the object of the present invention such as producing high density sintered bodies, it is effective to add carbon to the silicon carbide powder to reduce the oxides contained therein and conduct reduction treatment at an initial stage of the sintering step. For these reasons, carbon is added to the silicon carbide powder in a stoichiometric amount necessary for the reduction of the oxides contained the powder.

As for the carbon source, there may be used carbon black, colloidal carbon, and pyrolytic carbon derived from organic hydrocarbons with high residual carbon ratio. Examples of the organic hydrocarbons which can be used include phenol resins, polyphenylenes, furan resins, unsaturated polyesters, epoxy resins, furfural resins, amino resins, and the like. It is also possible to control the synthetic conditions of synthesis upon preparing the second silicon carbide powder by plasma CVD method so that the ultrafine powder (i.e., the second silicon carbide powder) can contain free carbon. In this case, the carbon contained is present in the form of small grains which have a mean grain size of from 0.005 to 0.03 μm and are reactive. Therefore, addition of carbon is particularly effective for obtaining effects of high sinterability, high electric conductivity, and the like. The crystal phase of carbon is in most cases amorphous but it can be crystalline depending on the conditions of synthesis.

In this case too, it is preferred that the amount of the second silicon carbide powder to be blended with the first silicon carbide powder is in the range of from 0.5 to 50% by weight. This is because when the amount of the second silicon carbide powder is below 0.5% by weight, the effect of mixing the silicon carbide powder is insufficient, and on the other hand when it is above 50% by weight, the cost for the production increases since the second silicon carbide powder is prepared by costly plasma CVD method, which increases price of the product, and the effect of increasing the sintered density nearly reaches a plateau. In order to obtain sintered bodies having a density as high as 3,00 g/cm$^3$, it is preferred to mix the ultrafine powder, i.e., the second silicon carbide powder in an amount of not less than 3% by weight.

Then, the mixture obtained by adding carbon to the silicon carbide powder is reduced. In the case of using silicon dioxide as the oxide, the reduction treatment is performed according to the following reactions (A) and (B).

$$SiO_2 + 2C \rightarrow Si + 2CO \tag{A}$$

$$SiO_2 + C \rightarrow SiO + CO \tag{B}$$

In order to accelerate the reactions, it is preferred to add carbon in an amount slightly higher than the stoichiometric amount. Also, it is preferred to perform the reactions at temperatures not higher than 1,800° C. since they must be performed at temperatures not exceeding the temperature at which sintering shrinkage of silicon carbide initiates. The atmosphere in which the reduction treatment is conducted is preferably in vacuum and the higher the degree of vacuum the greater effects can be obtained.

As the reactions (A) and (B) proceed, Si and SiO are formed. It is desirable to convert these compounds into SiC with excessive portion of the carbon added according to the reactions (C) and (D) described below since there is a possibility that Si and SiO cause the ultrafine silicon carbide powder (the second silicon carbide powder) to grow extraordinarily although the compounds are effective in accelerating the sintering of silicon carbide in the initial stage of the sintering.

$$Si + C \rightarrow SiC \tag{C}$$

$$SiO + 2C \rightarrow SiC + CO \quad (D)$$

Thereafter, the mixture after the reduction treatment is heated and sintered to obtain sintered silicon carbide bodies with a high electric conductivity. The heating temperature is preferably from 1,800° to 2,400° C. As for the sintering method, there can be used conventional sintering methods such as pressureless sintering, sintering under pressurized atmosphere, hot pressing, hot isostatic pressing (HIP) and the like as stated before. In order to obtain sintered silicon carbide bodies having higher density and electric conductivity, it is preferred to use pressurized sintering methods such as hot pressing and the like. It is particularly preferred to conduct sintering in a sintering atmosphere of vacuum, inert gas or reducing gas.

Upon the addition of carbon, the characteristics of the sintered silicon carbide body is adversely affected when the amount of carbon to be added is so large that excessive portion is undesirably large. Figure is a graph representing the relationship between the amount of free carbon and electric conductivity of the sintered silicon carbide body obtained by the process of the present invention. The electrically conductive sintered silicon carbide body used is one obtained by mixing silicon carbide powder used in Example 4 described hereinafter as the first silicon carbide powder, 5% by weight of ultrafine amorphous silicon carbide powder as the second silicon carbide, and a varied amount of carbon (Novolak type phenol resin) to vary the amount of free carbon present in the sintered body after sintering. From Figure, it can be seen that the electric resistivity of the sintered body increases according as the amount of free carbon contained therein increases.

The sintered silicon carbide bodies of the present invention have corrosion resistance superior to the conventional ones and exhibit a three point flexural strength at room temperature of 68 kg/mm$^2$ and that at a high temperature (1,500° C.) of 85 kg/mm$^2$ and a Vickers hardness of not lower than 2,500. Therefore, the sintered silicon carbide bodies of the present invention fully satisfy various characteristics such s high hardness, high thermal conductivity, high mechanical strength, high corrosion resistance, and excellent surface smoothness so that they are promising in various fields of application.

The sintered silicon carbide bodies obtained according to this embodiment of the present invention has a uniform, fine structure of a grain size as small as from 2 to 3 μm and therefore they show excellent electron discharge machinability not attainable by the conventional methods. For example, upon wire-type electron discharge machining or ram-type electron discharge machining, the speed of machining is 170 mm$^2$/minute, and the maximum surface roughness (Rmax) of the finished discharged surface is not higher than 1 μm, thus giving rise to a good finished surface. This enables free spherical finishing or three-dimensional finishing, with the result that it is possible to obtain products having any desired complex shapes with high accuracy.

EXAMPLES

The present invention will be described in greater detail with reference to examples, comparative examples and test examples. However, the present invention should not be construed as being limited to the examples.

Example 1

To β-type silicon carbide powder having a mean grain size of 0.33 μm and a specific surface area of 12 m$^2$/g (the first silicon carbide powder) was added ultrafine amorphous silicon carbide powder having a mean grain size of 0.02 μm and a specific surface area of 150 m$^2$/g (the second silicon carbide powder) obtained by gas phase synthesis by means of plasma CVD method using as the starting material a mixture of silicon tetrachloride and ethylene, in an amount of from 1 to 10% by weight, and the mixture was dispersed in methanol and mixed for 12 hours using a ball mill.

Then, the resulting mixture was formed to obtain molded compacts into a disc of 40 mm in diameter using conventional monoaxial press and the resulting compacts were heated to a temperature of 1,400° C. in vacuum using a hot press apparatus, followed by sintering in argon flow under a pressure of 400 kg/cm$^2$ at a sintering temperature of 2,150° C. for 45 minutes.

The sintered silicon carbide bodies thus obtained were examined for their sintered density, three point flexural strength at room temperature and electric resistivity. The results obtained are shown in Table 1.

TABLE 1

| E/C | Run No. | Crystal Phase of First Silicon Carbide Powder | | Crystal Phase of Second Silicon Carbide Powder | | Amount of Free Carbon Wt. % | Amount of Boron Wt. % |
|---|---|---|---|---|---|---|---|
| | | α-type Wt. % | β-type Wt. % | Amorphous Wt. % | β-type Wt. % | | |
| E-1 | 1 | — | 99.0 | 1.0 | — | — | — |
| | 2 | — | 97.0 | 3.0 | — | — | — |
| | 3 | — | 95.0 | 5.0 | — | — | — |
| | 4 | — | 90.0 | 10.0 | — | — | — |
| E-2 | 5 | — | 97.0 | — | 3.0 | — | — |
| | 6 | — | 95.0 | — | 5.0 | — | — |
| | 7 | — | 90.0 | — | 10.0 | — | — |
| E-3 | 8 | 90.0 | — | 10.0 | — | — | — |
| | 9 | 90.0 | — | — | 10.0 | — | — |
| C-1 | 10 | 100.0 | — | — | — | — | — |
| C-2 | 11 | — | 96.7 | — | — | 3.0 | 0.30 |
| C-3 | 12 | 96.7 | — | — | — | 3.0 | 0.30 |

| E/C | Run No. | Density of Sintered Body g/cm$^3$ | Three Point-Flexural Strength kg/mm$^2$ | Electric Resistivity Ω·cm |
|---|---|---|---|---|
| E-1 | 1 | 2.94 | 52 | 0.90 |
| | 2 | 3.05 | 57 | 0.55 |
| | 3 | 3.15 | 65 | 0.05 |
| | 4 | 3.17 | 67 | 0.03 |
| E-2 | 5 | 3.08 | 59 | 0.07 |
| | 6 | 3.14 | 67 | 0.04 |
| | 7 | 3.18 | 70 | 0.02 |
| E-3 | 8 | 3.17 | 65 | 0.85 |
| | 9 | 3.12 | 60 | 0.55 |
| C-1 | 10 | 2.50 | 10 | $5 \times 10^2$ |
| C-2 | 11 | 3.18 | 55 | $1 \times 10^5$ |
| C-3 | 12 | 3.16 | 52 | $1 \times 10^4$ |

Note:
"E" stands for "Example".
"C" stands for "Comparative".

From the results shown in Table 1, it was confirmed that the sintered silicon carbide bodies in this example had excellent electric resistivity. Indeed, the resulting sintered bodies had an electric resistivity on the order of 10$^{-1}$ Ω·cm when the amount of the ultrafine amorphous silicon carbide powder was not less than 1% by weight, and on the order of 10$^{-2}$ Ω·cm when that amount was not less than 5% by weight. The sintered body obtained in Run No. 4 had a grain size of from 2 to 3 μm and had uniform structure and also had excellent characteristic, e.g., a three point flexural strength at 1,500° C. of 80 kg/mm$^2$.

Example 2

To the same silicon carbide powder as used in Example 1 (the first silicon carbide powder) was added 3 to 10% by weight of ultrafine β-type silicon carbide powder having a mean grain size of 0.017 μm and a specific surface area of 145 m$^2$/g (the second silicon carbide powder) obtained by gas phase synthesis by means of plasma CVD method using as the starting material a mixture of monosilane and ethylene, and the mixture was treated and sintered under the same conditions as in Example 1 to produce sintered silicon carbide bodies.

The sintered silicon carbide bodies thus obtained were examined for their sintered density, three point flexural strength at room temperature and electric resistivity. The results obtained are shown in Table 1.

The results shown in Table 1 confirm that the effect of the present invention was obtained sufficiently even when using the β-type silicon carbide powder. In particular, Run No. 7 sintered silicon carbide body showed an excellent electric resistivity of as low as 0.02 Ω·cm.

Example 3

To α-type silicon carbide powder having a mean grain size of 0.07 μm and a specific surface area of 15 m$^2$/g (the first silicon carbide powder) was added the ultrafine amorphous silicon carbide powder as used in Example 1 and the ultrafine β-type silicon carbide powder as used in Example 2 each in an amount of 10% by weight, and the mixture was treated and sintered under the same conditions as in Example 1 to produce sintered silicon carbide bodies.

The sintered silicon carbide bodies thus obtained were examined for their sintered density, three point flexural strength at room temperature and electric resistivity. The results obtained are shown in Table 1.

As shown in Table 1, it was confirmed that the effect of the present invention was obtained using α-type silicon carbide powder as the first silicon carbide powder.

Comparative Example 1

The same β-type silicon carbide powder as used in Example 1 was sintered under the same conditions as in Example 1 to produce sintered silicon carbide body. The density of the sintered body thus obtained was examined and the results obtained are shown in Table 1 for comparison.

The results shown in Table 1 show that the sample of Comparative Example 1 had a low sintered density as much as 2.50 g/cm$^3$, a three point flexural strength of 10 kg mm$^2$ and an electric resistivity of 5×10$^2$ Ω·cm, each of which characteristics was inferior to the electrically conductive sintered silicon carbide bodies of the present invention.

Comparative Example 2

To the same β-type silicon carbide powder as used in Example 1 (the first silicon carbide powder) was added 0.3% by weight of boron having a mean grain size of 0.5 μm and also Novolak type phenol resin in an amount such that residual carbon content after pyrolysis became 3% by weight, and the resulting mixture was sintered under the same conditions as in Example 1 to produce sintered silicon carbide body.

Upon examination, the sintered body thus obtained had a grain size of from 4 to 5 μm. Its electric resistivity was 10$^5$ Ω·cm as shown in Table 1, which value was much higher than those of the electrically conductive sintered silicon carbide bodies of the invention.

Comparative Example 3

To the same α-type silicon carbide powder as used in Example 3 (the first silicon carbide powder) was added 0.3% by weight of boron having a mean grain size of 0.5 μm and also Novolak type phenol resin in an amount such that residual carbon content after pyrolysis became 3% by weight, and the resulting mixture was sintered under the same conditions as in Example 1 to produce sintered silicon carbide body.

Upon examination, the sintered body thus obtained had a grain size of from 5 to 6 μm. Its electric resistivity was 10$^4$ Ω·cm, which value was much higher than those of the sintered silicon carbide bodies of the invention.

Test Example 1

Wire-type electron discharge machining test was conducted on Run No. 5 electrically conductive sintered silicon carbide body obtained in Example 1 (diameter: 40 mm, thickness: 30 mm) using an electron discharge machining apparatus of transistor pulse circuit type. As for the discharge wire, there was used a bras wire of 2 mm in outer diameter. The test was performed under the conditions of a machining voltage of 50 V, pulse width of 1.2 μsec and pause of 20 μsec.

Upon the test, stable electron discharge machining was performed successfully. The speed of electron discharge machining was 150 mm$^2$/minute and the maximum surface roughness of the electron discharge machined surface was on the order of Rmax 2.5 μm. From these, it was confirmed that the electron discharge machinability was good. In addition, the thus-treated surface was further subjected to finishing electron discharge machining to obtain an excellent smooth surface having an Rmax of 0.9 μm or less. Upon examination with a scanning type electron microscope revealed that the sintered body had no defects such as cracks.

Example 4

To β-type silicon carbide powder having a mean grain size of 0.33 μm and a specific surface area of 12 m$^2$/g and containing 0.85% by weight of silicon dioxide as an impurity (the first silicon carbide powder) was added 5 to 10% by weight of ultrafine amorphous silicon carbide powder having a mean grain size of 0.02 μm and a specific surface area of 150 m$^2$/g and containing 2.5% by weight of silicon dioxide as an impurity (the second silicon carbide powder) obtained by gas phase synthesis by means of plasma CVD method using as the starting material a mixture of silicon tetrachloride and ethylene, and further Novolak type phenol resin in an amount such that residual carbon content after pyrolysis became from 0.5 to 3% by weight, and the resulting mixture was dispersed in methanol and mixed for 12 hours using a ball mill.

Then, the resulting mixture was charged in a graphite mold after evaporating methanol in a drying vessel and grinding, and the graphite mold was fitted to a hot press apparatus The mixture was heated to a temperature of 1,500° C. in vacuum to debinderization and reduction treatment, followed by sintering in argon flow under a pressure of 400 kg/cm² at a sintering temperature of 2,150° C. for 45 minutes.

The sintered silicon carbide bodies thus obtained were examined for their sintered density, and three point flexural strength at room temperature and electric resistivity. The results obtained are shown in Table 2.

TABLE 2

| E/C | Run No. | Crystal Phase of First Silicon Carbide Powder | | Crystal Phase of Second Silicon Carbide Powder | | Amount of Carbon After Pyrolysis Wt. % | Amount of Boron Wt. % |
|---|---|---|---|---|---|---|---|
| | | α-type Wt. % | β-type Wt. % | Amorphous Wt. % | β-type Wt. % | | |
| E-4 | 1 | — | 94.5 | 5.0 | — | 0.5 | — |
| | 2 | — | 94.0 | 5.0 | — | 1.0 | — |
| | 3 | — | 93.0 | 5.0 | — | 2.0 | — |
| | 4 | — | 92.0 | 5.0 | — | 3.0 | — |
| | 5 | — | 88.0 | 10.0 | — | 2.0 | — |
| E-5 | 6 | — | 94.0 | — | 5.0 | 1.0 | — |
| | 7 | — | 93.0 | — | 5.0 | 2.0 | — |
| | 8 | — | 92.0 | — | 5.0 | 3.0 | — |
| | 9 | — | 88.0 | — | 10.0 | 2.0 | — |
| E-6 | 10 | 88.0 | — | 10.0 | — | 2.0 | — |
| | 11 | 88.0 | — | — | 10.0 | 2.0 | — |
| E-7 | 12 | — | 89.5 | 10.0 | — | (0.5) | — |
| C-4 | 13 | — | 96.7 | — | — | 3.0 | 0.30 |
| C-5 | 14 | 96.7 | — | — | — | 3.0 | 0.30 |

| E/C | Run No. | Density of Sintered Body g/cm³ | Three Point-Flexural Strength kg/mm² | Electric Resistivity Ω · cm |
|---|---|---|---|---|
| E-4 | 1 | 3.15 | — | 0.045 |
| | 2 | 3.16 | — | 0.019 |
| | 3 | 3.16 | 67 | 0.008 |
| | 4 | 3.12 | — | 0.095 |
| | 5 | 3.16 | — | 0.011 |
| E-5 | 6 | 3.16 | — | 0.017 |
| | 7 | 3.17 | 67 | 0.007 |
| | 8 | 3.14 | — | 0.085 |
| | 9 | 3.15 | — | 0.014 |
| E-6 | 10 | 3.15 | 68 | 0.088 |
| | 11 | 3.16 | — | 0.075 |
| E-7 | 12 | 3.16 | 70 | 0.009 |
| C-4 | 13 | 3.18 | 55 | $2 \times 10^5$ |
| C-5 | 14 | 3.16 | 52 | $2 \times 10^4$ |

Note:
"E" stands for "Example".
"C" stands for "Comparative".
Numbers in the brackets denote the free carbon in the ultrafine silicon carbide powder obtained by gas phase synthesis by means of plasma CVD method.

From the results shown in Table 2, it was confirmed that in the sintered silicon carbide bodies obtained in this example, the resulting sintered bodies had an electric resistivity of not higher than 0.01 Ω·cm when the amount of the ultrafine amorphous silicon carbide powder added was not less than 5% by weight and the amount of the pyrolytic carbon was from 1 to 3% by weight. This indicated that the electrically conductive sintered silicon carbide bodies were highly electrically conductive. The electrically conductive sintered silicon carbide body obtained in Run No. 3 exhibited excellent characteristics, e.g., a grain size of from 2 to 3 μm and had uniform structure and also had excellent characteristic, e.g., a three point flexural strength at 1,500° C. of 67 kg/mm².

Example 5

To the same silicon carbide powder as used in Example 4 (the first silicon carbide powder) was added 5% by weight of ultrafine β-type silicon carbide powder having a mean grain size of 0.017 μm and a specific surface area of 145 m²/g and containing 1.55% by weight of silicon dioxide as an impurity (the second silicon carbide powder) obtained by gas phase synthesis by means of plasma CVD method using as the starting material a mixture of monosilane and ethylene, and further Novolak type phenol resin in an amount such that residual carbon content after pyrolysis became from 1 to 3% by weight, and the mixture was treated for reduction and sintered under the same conditions as in Example 4 to produce sintered silicon carbide bodies.

The sintered silicon carbide bodies thus obtained were examined for their sintered density, three point flexural strength at room temperature and electric resistivity. The results obtained are shown in Table 2.

The results shown in Table 2 confirm that the effect of the present invention was obtained sufficiently even when using the ultrafine β-type silicon carbide powder. In particular, Run No. 7 sintered silicon carbide body showed an excellent electric resistivity of as low as 0.007 Ω·cm.

Example 6

To α-type silicon carbide powder having a mean grain size of 0.70 μm and a specific surface area of 15 m²/g and containing 0.7% by weight of silicon dioxide as an impurity (the first silicon carbide powder) was added 10% by weight of the ultrafine amorphous silicon carbide powder as used in Example 4 (the second silicon carbide powder) and 10% by weight of the ultrafine β-type silicon carbide powder as used in Example 5 and further Novolak type phenol resin in an amount such that residual carbon content after pyrolysis became 2% by weight, and the mixture was treated and sintered under the same conditions as in Example 4 to produce sintered silicon carbide bodies.

The sintered silicon carbide bodies thus obtained were examined for their sintered density, three point flexural strength at room temperature and electric resistivity. The results obtained are shown in Table 2.

As shown in Table 2, it was confirmed that the effect of the present invention was also obtained using α-type silicon carbide powder as the first silicon carbide powder.

Example 7

The same silicon carbide powder as the first silicon carbide powder used in Example 4 was provided. The second silicon carbide powder containing free carbon was prepared as follows.

That is, silicon tetrachloride and ethylene as the starting materials were subjected to gas phase synthesis by means of plasma CVD method under the conditions in which their molar ratio was changed such that C/Si ratio by mole became not smaller than 1.2 to obtain ultrafine amorphous silicon carbide powder having a mean grain size of 0.019 μm and a specific surface area of 155 m²/g and containing 1.40% by weight of silicon dioxide as an impurity and 5.25% by weight of free carbon (the second silicon carbide powder).

Then, 10% by weight of the second silicon carbide powder containing free carbon was added to the first silicon carbide powder, and mixed. The resulting mixture was subjected to reduction treatment in the same manner as in Example 4, followed by sintering in the same manner as in Example 4 to obtain sintered silicon carbide bodies.

The sintered silicon carbide bodies thus obtained were examined for their sintered density, three point flexural strength at room temperature and electric resistivity. The results obtained are shown in Table 2.

As shown in Table 2, it was confirmed that the effect of the present invention was further improved using, as the source of carbon for reducing the oxides contained in the silicon carbide powder, the excessive carbon contained in the ultrafine silicon carbide powder prepared by gas phase synthesis by means of CVD method.

Comparative Example 4

To the same β-type silicon carbide powder as used in Example 4 (the first silicon carbide powder) was added 0.3% by weight of boron having a mean grain size of 0.5 μm and also Novolak type phenol resin in an amount such that residual carbon content after pyrolysis became 3% by weight, and the resulting mixture was sintered under the same conditions as in Example 4 to produce sintered silicon carbide body.

Upon examination, the sintered body thus obtained had a grain size of from 4 to 5 μm. Also, as shown in Table 2, it had an electric resistivity of $2 \times 10^5$ Ω·cm, which value was much higher than those of the electrically conductive sintered silicon carbide bodies of the invention.

Comparative Example 5

To the same α-type silicon carbide powder as used in Example 6 (the first silicon carbide powder) were added 0.3% by weight of boron having a mean grain size of 0.5 μm and also Novolak type phenol resin in an amount such that residual carbon content after pyrolysis became 3% by weight, and the resulting mixture was subjected to reduction treatment and sintered under the same conditions as in Example 4 to produce sintered silicon carbide body.

Upon examination, the sintered body thus obtained had a grain size of from 5 to 6 μm. Also, as shown in Table 2, it had an electric resistivity of $5 \times 10^4$ Ω·cm, which value was much higher than those of the electrically conductive sintered silicon carbide bodies of the invention.

Test Example 2

Wire-type electron discharge machining test similar to that carried out in Test Example 1 was conducted on Run No. 3 high conductivity sintered silicon carbide body obtained in Example 4 (diameter: 40 mm, thickness: 30 mm) using an electron discharge machining apparatus of transistor pulse circuit type. As for the discharge wire, there was used a brass wire of 2 mm in outer diameter. The test was performed under the conditions of a machining voltage of 50 V, pulse width of 1.2 μsec and pause of 20 μsec.

Upon the test, stable electron discharge machining was performed successfully. The speed of electron discharge machining was 170 mm²/minute and the maximum surface roughness Rmax of the electron discharge machined surface was on the order of 2.3 μm. From these, it was confirmed that the electron discharge machinability was good. In addition, the thus-treated surface was further subjected to finishing electron discharge machining to obtain an excellent smooth surface having an Rmax of 0.7 μm or less. Upon examination with a scanning type electron microscope, it revealed that the sintered body had no defects such as cracks.

What is claimed is:

1. An electrically conductive sintered silicon carbide body having an electric resistivity of not more than 1 Ω·cm, characterized by
   (a) mixing
      (1) a first silicon carbide powder having a mean grain size of from 0.1 to 10 μm with
      (2) a second silicon carbide powder having a mean grain size of not greater than 0.1 μm prepared by
         (2-1) introducing a starting gas composed of a silane compound or silicon halide and a hydrocarbon into a plasma of a non-oxidative atmosphere, and
         (2-2) conducting gas phase reaction between said silane compound or silicon halide and said hydrocarbon while controlling the pressure of the reaction system within the range of from less than 1 atm to 0.1 torr, and
   (b) heating the resulting mixture to a temperature from 1800°-2400° C. sufficient to effect sintering in vacuo, an inert atmosphere or a reducing atmosphere.

2. A process of producing an electrically conductive sintered silicon carbide body having an electric resistivity of not higher than 1 Ω·cm, characterized by
   (a) mixing
      (1) a first silicon carbide powder having a mean grain size of from 0.1 to 10 μm with
      (2) a second silicon carbide powder having a mean grain size of not greater than 0.1 μm prepared by
         (2-1) introducing a starting gas composed of a silane compound or silicon halide and a hydrocarbon into a plasma of a non-oxidative atmosphere, and
         (2-2) conducting gas phase reaction between said silane compound or silicon halide and said hydrocarbon while controlling the pressure of the reaction system within the range of from less than 1 atm to 0.1 torr, and
   (b) heating the resulting mixture to a temperature from 1800°-2400° C. sufficient to effect sintering in vacuo, an inert atmosphere or a reducing atmosphere.

3. A sintered silicon carbide body having an electric resistivity of not higher than 0.1 Ω·cm, characterized by being prepared by
   (a) mixing
      (1) a first silicon carbide powder having a mean grain size of from 0.1 to 10 μm with
      (2) a second silicon carbide powder having a mean grain size of not greater than 0.1 μm prepared by
         (2-1) introducing a starting gas composed of a silane compound or silicon halide and a hydrocarbon into a plasma of a non-oxidative atmosphere, and
         (2-2) conducting gas phase reaction between said silane compound or silicon halide and said hydrocarbon while controlling the pressure of the reaction system within the range of from less than 1 atom or 0.1 torr, and
      (3) a carbon which is required for reducing oxides contained in both said first and second silicon carbide powders, wherein said carbon is selected from the group consisting of carbon black, colloidal carbon and pyrolytic carbon derived from an organic hydrocarbon having a high residual carbon ratio, in an amount sufficient to reduce oxides, (b) reducing said oxides with said carbon, in vacuo, and (c) heating the resulting mixture to a temperature from 1800°–2400° C. sufficient to effect sintering in vacuo, an inert atmosphere or a reducing atmosphere.

4. The sintered body as claimed in claims 1 or 3, wherein the content of said second silicon carbide powder is from 0.5 to 50% by weight.

5. The sintered body as claimed in claims 1 or 3, wherein said second silicon carbide powder has a crystal phase selected from the group consisting of amorphous type, α-type, β-type and mixtures thereof.

6. The sintered body as claimed in claim 3, wherein said carbon is contained in said second silicon carbide powder.

7. The sintered body as claimed in claims 1 or 3, wherein said sintered body has a density of not less than 3.00 g/cm$^3$.

8. A process of producing a sintered silicon carbide body having an electric resistivity of not higher than 0.1 Ωcm, characterized by (a) mixing
   (1) a first silicon carbide powder having a mean grain size of from 0.1 to 10 μm with
   (2) a second silicon carbide powder having a mean grain size of not greater than 0.1 μm prepared by
      (2-1) introducing a starting gas composed of a silane compound or silicon halide and a hydrocarbon into a plasma of a non-oxidative atmosphere, and
      (2-2) conducting gas phase reaction between said silane compound or silicon halide and said hydrocarbon while controlling the pressure of the reaction system within the range of from less than 1atm to 0.1 torr, and
   (3) a carbon powder which is required for reducing oxides contained in both said first and second silicon carbide powders, wherein said carbon is selected from the group consisting of carbon black, colloidal carbon and pyrolytic carbon derived from an organic hydrocarbon having a high residual carbon ratio, in an amount sufficient to reduce oxides, (b) reducing said oxides with said carbon in vacuo, and (c) heating the resulting mixture to a temperature from 1800°–2400° C. sufficient to effect sintering in vacuo, an inert atmosphere or a reducing atmosphere.

9. The process as claimed in claims 2 or 8, wherein the content of said second silicon carbide powder is from 0.5 to 50% by weight.

10. The process as claimed in claims 2 or 8, wherein said second silicon carbide powder has a crystal phase selected from the group consisting of amorphous type, α-type, β-type and mixtures thereof.

11. The process as claimed in claim 8, wherein said carbon is contained in said second silicon carbide powder.

* * * * *